Nov. 13, 1951     C. BANGERT, JR     2,574,998
ROUND CORNERED BOX
Filed May 3, 1946
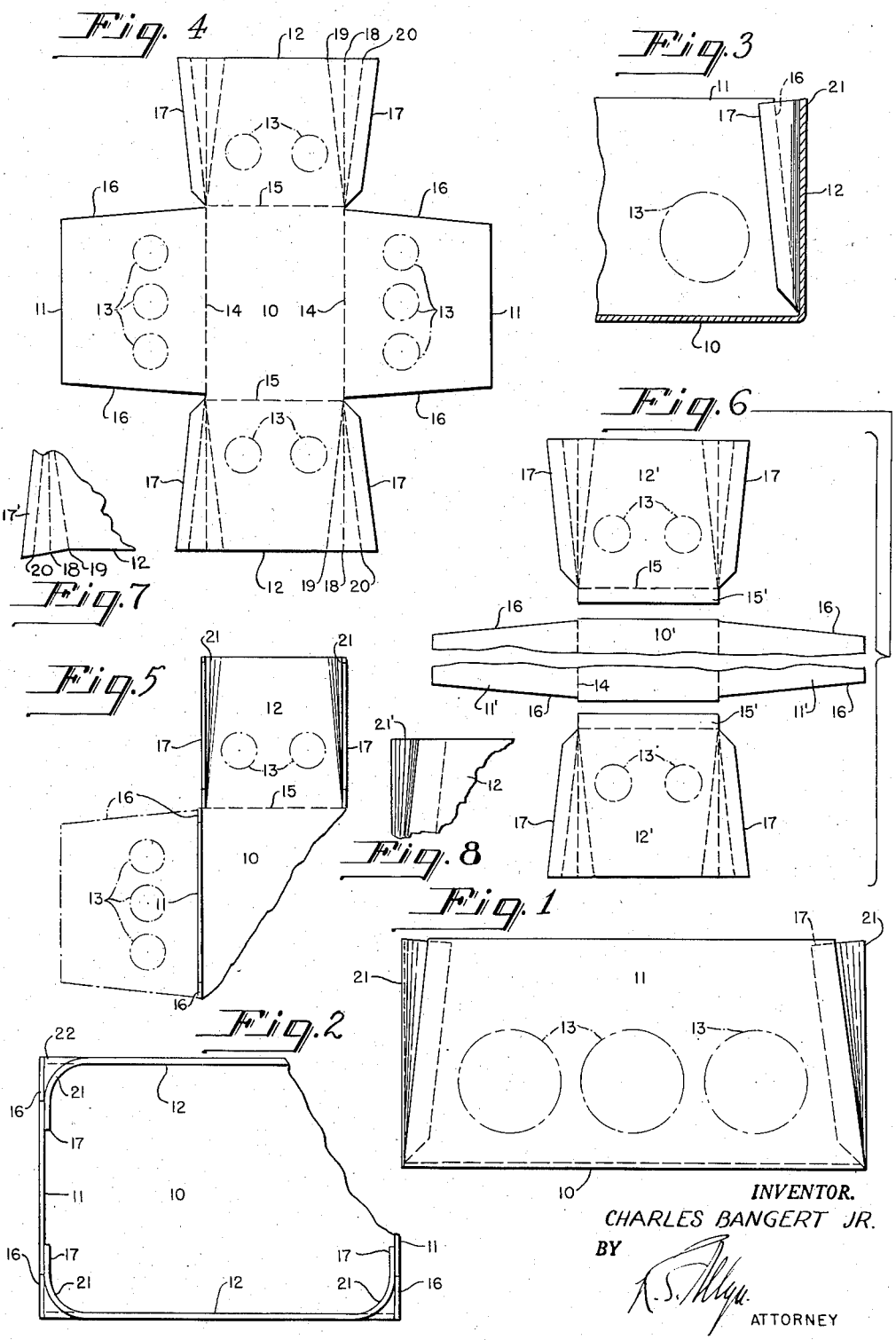
INVENTOR.
CHARLES BANGERT JR.
BY
ATTORNEY Patented Nov. 13, 1951

2,574,998

UNITED STATES PATENT OFFICE 2,574,998

ROUND CORNERED BOX

Charles Bangert, Jr., Ballston Spa, N. Y., assignor to General Electric Company, a corporation of New York Application May 3, 1946, Serial No. 667,027

1 Claim. (Cl. 220—3.2)

It has become desirable to make switch boxes, terminal boxes and other enclosures for electrical equipment with round corners. Round corners on boxes however involve various manufacturing difficulties and mechanical and electrical difficulties.

The primary object of the present invention is to make a switch box or enclosure for electrical equipment having its four walls perpendicular to the bottom but having the appearance of rounded corners, without sacrificing the ease of manufacture of the conventional bent-up square cornered box, and without substantially lessening the desired number and spacing of conduit connection holes, commonly called "knockouts."

The invention may be applied to the ordinary single-piece bent-up box or the equally well known three-piece bent-up box. It has no application to a drawn box or to the two-piece box made up of a back plate and a wrapped-around section forming the side walls, because in these constructions round corners can easily be obtained.

In the ordinary square cornered box of one or three pieces, the blank or blanks are first cut out and the knockouts formed in the various walls. After this, a single V-bending tool is used to bend up the sides and any over-lapping flanges which might be used. Then the parts or corners are riveted, welded or otherwise secured together.

In making a round cornered box by known methods, two disadvantages have presented themselves. First, to make a tight joint at the corner it has been necessary to either draw the box or to use expensive forming dies on a number of pieces; and secondly, the knockouts in the sides of the box have to be spaced further away from the corners of the box to allow for the curvature at the corners.

In a drawn-round cornered box, there is the added disadvantage that the knockouts must be formed by a special tool in a separate operation after the box has been completely shaped.

Drawing a one-piece box requires heavy and expensive equipment which cannot easily be altered to take care of varying box sizes and shapes. Forming the box in two pieces requires extra handling of parts and a careful shaping and placing of the knockouts and of the box parts. Usually special clamps or fixtures are necessary to hold the parts in proper relation while they are being secured together.

The knockouts should be spaced as closely as possible to the corners in the sides of the box, otherwise space within the box is not used economically, or the box has to be made larger than is usually necessary to accommodate the equipment for which it is intended. In the past, this was regarded as a necessary evil in round-cornered boxes, because the knockouts must be placed on flat surfaces of the box, and the rounded corners decrease the available flat surface at the ends of the box sides.

In the present invention, the attractive visual effect of a round cornered box is obtained, while the advantages of the conventional square cornered box in manufacturing economy and in knockout location are substantially maintained. This is done by making at least a part of each corner of the box in the shape of a quarter cone, with the usual joining details added. Because the apex of each quarter cone is at or near the back of the box and, therefore, near the preferred level of the knockouts, there is not much loss of flat surface where it is needed on the box sides. From the front, the box looks round-cornered and in fact it may be used with a cover designed originally for a full round-cornered box.

For easiest manufacturing, the quarter cone is bent-up entirely out of the end of only one of the joining sides. If it is a one-piece box, this bend can be made first, at the same time that the adjacent side wall is bent with a straight V-bend. The final bend is then a simple straight V-bend of the side carrying the quarter cone. The tools are substantially the same as for a square cornered box excepting that the quarter cones are added to the tools used in the first bending operation.

The same basic idea can be used in making a three-piece box, making the quarter cones at the ends of the walls which are inserted at the top and bottom of the straight main trough which comprises the back and sides of the box. The ends on the sides of this trough are tapered slightly to accommodate the quartered cone.

Obviously, any type of joint can be used, although the simplest one to manufacture is the only one shown. This is the plain overlap which is welded or riveted. I might use a stepped overlap or a butt joint welded or brazed, or a butt joint with an extra overlapping piece inside of the box, or even a dove-tail formation on the two edges which are brought together. All of these joints, excepting the simple overlap, may introduce additional tooling or manufacturing costs without substantially increasing the round cornered appearance.

Fig. 1 is a side view of a box involving one form of my invention.

Fig. 2 is a plan view of the box, parts being broken away.

Fig. 3 is a fragmentary vertical sectional view showing a corner.

Fig. 4 shows an outline of a one-piece blank for forming the box of Fig. 1.

Fig. 5 is a view showing the parts partly formed.

Fig. 6 is an exploded view of blanks for forming a three-piece box of my invention.

Fig. 7 is a fragmentary view of a corner of a blank showing a modified corner before curling.

Fig. 8 is a fragmentary view showing the corner of Fig. 7 partly formed.

The box may be square or oblong as is customary and has a bottom 10, two side walls 11, 11 and two other walls 12 which for convenience we will call end walls although the relative sizes are immaterial. Either the side or end walls or both may have knock-outs 13.

The outline of the bottom of the one-piece blank is indicated by the dotted lines 14 and 15, Figure 4. The edges 16 of the sides are inclined inward somewhat relative to a normal to the base line 14. The edges 17 are also inclined relative to a normal 18 to the line 15 but extend laterally beyond the normal. To form a rounded corner the part of the extension between lines 19 and 20 is curled or formed into a quarter-cone 21 with the flat edge flap between lines 20 and 17 serving as the anchorage or overlap to be secured to the edge 16 of the side wall 11 when the box is formed.

The box may be formed of the one-piece blank of Fig. 4 by bending the sides 11, 11 along lines 14, 14 and simultaneously curling the conical parts 21 as shown in Fig. 5. The end walls 12 are then bent up along lines 15, 15 and the edges 17 secured to the edges 16 in any suitable and well known manner as for instance by welding, riveting, or butt or dove-tailed joint. When the parts are united, it will be found that the bottom of the box has a square corner 22 while the outer edge has a quarter-turn or rounded corner.

Similar results can be obtained with a three-piece blank 10', 11' and 12' of Fig. 6. In this case, the bottom 10' and sides 11' will be formed into a trough shape and the ends 12' will have flanges 15' which will be bent at right angles to the plane of wall 12' and secured to the adjacent edge of the bottom 10'. The edges of 12' will be curled as before and united to the edges of the side walls 11' as above.

The corners of the blank which are to be curled to permit the conical corners of the box may be slightly extended as shown at 17' in Figure 7 so that the edges of the box when formed will be as shown at 21' in Figure 8.

It will be seen that in such a construction that the knockouts can be readily formed and almost as close to the corners of the box as in a square cornered box. The box will have the appearance and all other advantages of a round cornered box without sacrificing the ease of manufacture of the conventional box. The side and end walls being perpendicular to the bottom of the box, conduit connections can be made using any of the conventional knockouts and straight conduits so joined to a wall will extend straight out parallel with the plane of the bottom of the box.

I claim:

An open top receptacle for electrical apparatus formed from a blank of sheet metal and having a rectangular bottom and trapezoidal side walls, each side wall extending in a plane perpendicular to the bottom, each of two opposed side walls being planar and of less width at its top edge than at the bottom, the intervening side walls having integral quarter-turn conical shaped side edges secured to the adjacent edges of the respective opposed walls, forming rounded corners at the open top of the box.

CHARLES BANGERT, Jr.

REFERENCES CITED

The following references are of record in the file of this patent:

UNITED STATES PATENTS

| Number | Name | Date |
|---|---|---|
| 16,226 | Beach | Dec. 16, 1856 |
| 579,946 | Barrow | Apr. 6, 1897 |
| 665,731 | Engberg | Jan. 8, 1901 |
| 1,177,410 | Hatfield | Mar. 28, 1916 |
| 1,676,298 | Stieglitz | July 10, 1928 |
| 2,000,850 | Knell | May 7, 1935 |
| 2,016,284 | Knight | Oct. 8, 1935 |
| 2,060,893 | Polivka et al. | Nov. 17, 1936 |
| 2,211,929 | Hallberg | Aug. 20, 1940 |

FOREIGN PATENTS

| Number | Country | Date |
|---|---|---|
| 965 | Great Britain | 1874 |
| 66,668 | Germany | Jan. 1893 |
| 466,760 | Great Britain | June 4, 1937 |